United States Patent [19]

Kaplan et al.

[11] Patent Number: 5,373,030

[45] Date of Patent: Dec. 13, 1994

[54] POLYURETHANE FOAMS HAVING IMPROVED RETENTION OF INSULATIVE PROPERTIES AND METHODS FOR THE PREPARATION THEREOF

[75] Inventors: Warren A. Kaplan, Lake Jackson; Douglas R. Moore, Clute; Ricky L. Tabor; Alan K. Schrock, both of Lake Jackson, all of Tex.

[73] Assignee: The Dow Chemical Company, Midland, Mich.

[21] Appl. No.: 85,229

[22] Filed: Jun. 29, 1993

[51] Int. Cl.$^5$ .............................................. C08G 18/48
[52] U.S. Cl. ..................... 521/173; 521/174; 521/175
[58] Field of Search ........................ 521/175, 174, 173

[56] References Cited

U.S. PATENT DOCUMENTS

| | | | |
|---|---|---|---|
| 1,714,173 | 5/1929 | Kessler et al. | 521/171 |
| 3,647,759 | 3/1972 | Walker | 521/173 |
| 4,039,487 | 8/1977 | Kolakowski et al. | 521/175 |
| 4,048,104 | 9/1977 | Svoboda et al. | 521/174 |
| 4,092,276 | 5/1978 | Narayan | 521/175 |
| 4,223,068 | 9/1980 | Carlstrom et al. | 428/310 |
| 4,237,238 | 12/1980 | DeGuiseppi et al. | 521/131 |
| 4,246,364 | 1/1981 | Koehler et al. | 521/167 |
| 4,246,365 | 1/1981 | Wiedermann et al. | 521/172 |
| 4,307,205 | 12/1981 | Bershas | 521/171 |
| 4,336,341 | 6/1982 | Fujiwara et al. | 521/172 |
| 4,469,824 | 9/1984 | Grigsby, Jr. et al. | 521/173 |
| 4,481,309 | 11/1984 | Straehle et al. | 521/172 |
| 4,487,853 | 12/1984 | Reichel et al. | 521/172 |
| 4,521,611 | 6/1985 | Magnus | 528/83 |
| 4,526,908 | 7/1985 | Magnus et al. | 521/112 |
| 4,529,744 | 7/1985 | Wood | 521/131 |
| 4,530,938 | 7/1985 | White | 521/105 |
| 4,542,163 | 9/1985 | White et al. | 521/105 |
| 4,544,679 | 10/1985 | Tideswell et al. | 521/116 |
| 4,582,926 | 4/1986 | Straehle et al. | 560/91 |
| 4,595,711 | 6/1986 | Wood | 521/158 |
| 4,604,410 | 8/1986 | Altenberg | 521/172 |
| 4,605,729 | 8/1986 | Barnes et al. | 528/301 |
| 4,615,822 | 10/1986 | Magnus | 252/182 |
| 4,642,319 | 2/1987 | McDaniel | 521/175 |
| 4,644,019 | 2/1987 | McDaniel | 521/173 |
| 4,644,027 | 2/1987 | Magnus et al. | 524/375 |
| 4,644,047 | 2/1987 | Wood | 528/176 |
| 4,644,048 | 2/1987 | Magnus et al. | 528/176 |
| 4,647,595 | 3/1987 | Kozawa et al. | 521/158 |
| 4,691,045 | 9/1987 | Fukuchi et al. | 522/95 |
| 4,753,967 | 6/1988 | Londrigan | 521/172 |
| 4,902,816 | 2/1990 | McDaniel | 521/172 |
| 5,001,165 | 3/1991 | Canaday et al. | 521/131 |
| 5,003,027 | 3/1991 | Nodelman | 528/79 |
| 5,114,755 | 5/1992 | Canaday et al. | 427/373 |

OTHER PUBLICATIONS

German Abstract 1,555,908–Oct. 1963.
BE Abstract—771815-Q Aug. 1970.
Chemical Abstract 89: 110981r-1978 May 1978.
Chemical Abstract 77764h vol. 75, 1971 Jun. 1971.
German Abstract 2,110,278 Jul. 1972.
DT Abstract—210278-Q Mar. 1970.
Chemical Abstract 125522u May 1969 vol. 71, 1969.
Chemical Abstract 26048r Aug. 1971 vol. 76, 1972.
Derwent Abstract 85-052388/09 Jun. 1983.

*Primary Examiner*—John Kight, III
*Assistant Examiner*—R. F. Johnson

[57] ABSTRACT

Polyurethane foams can be prepared which have improved retention of insulative properties. The foams are prepared from formulations including a glycerine initiated ethoxylated polyol prepared from a formulation including from about two to about three moles of ethylene oxide per mole of glycerine initiator and/or a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2.

10 Claims, No Drawings

POLYURETHANE FOAMS HAVING IMPROVED RETENTION OF INSULATIVE PROPERTIES AND METHODS FOR THE PREPARATION THEREOF

BACKGROUND OF THE INVENTION

The present invention relates to insulative polyurethane foams. The present invention particularly relates to polyurethane foams having improved retention of insulative properties.

It is known to prepare polyurethanes by reacting polyisocyanates with active hydrogen containing materials. For example, it is known to combine methylene diphenyldiisocyanate (MDI) or polymeric methylene diphenyldiisocyanate (PMDI) with polyether or polyester polyols to prepare polyurethane foams having good insulative properties. These insulating foams may be found in applications ranging from home construction to ice chests and refrigerators and even to industrial applications such as pipe and vessel insulation.

In addition to good insulative properties, polyurethane foams, particularly rigid polyurethane foams can have other desirable properties. For example, such foams can have good structural properties such as compressive strength, abrasion resistance and dimensional stability upon exposure to temperature and humidity changes. Isocyanurate foams can have particularly good flame resistance. All of these properties are resultant upon a careful choice of formulation components used to prepare the foams.

But preparing polyurethane foams is not always trouble free. Sometimes problems can arise with formulations which do riot have some desired physical property. For example, a foam can have poor flame resistance and a reformulation to correct that problem may be required. Other problems can arise in other areas not directly associated with foam properties. For example, the use of chlorofluorocarbon (CFC) blowing agents has become subject to increasing criticism and regulation due to environmental concerns.

One solution to the use of CFC blowing agents in preparing polyurethane foams has been to use alternative blowing agents such as carbon dioxide and hydrochlorofluorocarbon (HCFC) blowing agents. But such a solution can sometimes be a problem in itself. Use of carbon dioxide and HCFC blowing agents can result in polyurethane foams which can lose some of their insulative properties over time. It would be desirable in the art of preparing polyurethane foams with alternative blowing agents to prepare foams which can retain their insulative properties longer than conventional foams.

SUMMARY OF THE INVENTION

In one aspect, the present invention is a polyurethane foam having improved retention of insulative properties comprising the product of admixing a polyurethane formulation including (1) a polyisocyanate, (2) a carbon dioxide blowing agent, and (3) an active hydrogen containing admixture including (A) from about 10 to about 90 parts per 100 parts total active hydrogen containing admixture of an active hydrogen containing material selected from the group consisting of (i) a glycerine initiated ethoxylated polyol prepared from a formulation including from about two to about three moles of ethylene oxide per mole of glycerine initiator; (ii) a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2; and (iii) mixtures thereof; and (B) from about 90 to about 10 parts per 100 parts of total active hydrogen containing admixture of a polyester or polyether polyol having an equivalent weight of from about 40 to about 400 and a nominal functionality of from 2 to 8, under reaction conditions sufficient to prepare a polyurethane foam.

In another aspect, the present invention is a method of preparing a polyurethane foam having improved retention of insulative properties comprising admixing a polyurethane formulation including (1) a polyisocyanate, (2) a carbon dioxide blowing agent, and (3) an active hydrogen containing admixture including (A) from about 10 to about 90 parts per 100 parts total active hydrogen containing admixture of an active hydrogen containing material selected from the group consisting of (i) a glycerine initiated ethoxylated polyol prepared from a formulation including from about two to about three moles of ethylene oxide per mole of glycerine initiator; (ii) a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2; and (iii) mixtures thereof; and (B) from about 90 to about 10 parts per 100 parts of total active hydrogen containing admixture of a polyester or polyether polyol having an equivalent weight of form about 40 to about 400 and a nominal functionality of from 2 to 8, under reaction conditions sufficient to prepare a polyurethane foam.

In yet another aspect, the present invention is an active hydrogen contianing admixture formulation useful for preparing polyurethane foams having improved retention of insulative properties comprising an active hydrogen containing admixture including (A) from about 10 to about 90 parts per 100 parts total active hydrogen containing admixture of an active hydrogen containing material selected from the group consisting of (i) a glycerine initiated ethoxylated polyol prepared from a formulation including from about two to about three moles of ethylene oxide per mole of glycerine initiator; (ii) a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2; and (iii) mixtures thereof; and (B) from about 90 to about 10 parts per 100 parts of total active hydrogen containing admixture of a polyester or polyether polyol having an equivalent weight of from about 40 to about 400 and a nominal functionality of from 2 to 8.

The foams of the present invention offer unique high barrier resistance to carbon dioxide and air. However, the foams of the present invention are prepared using standard rigid foam processing technology. The foam formulations of the present invention offer a significant improvement over conventional foam formulations.

DESCRIPTION OF THE PREFERRED EMBODIMENTS

In one embodiment, the present invention is a polyurethane foam having improved retention of insulative properties. The use of non-CFC blowing agents, (hereinafter alternative blowing agents) can result in a phenomena wherein a foam, freshly prepared from a polyurethane formulation including an alternative blowing agent, can have good insulative properties, but then lose those good properties more quickly than a foam prepared from an otherwise similar polyurethane foam formulation including CFC blowing agents. It is believed that this results from a tendency of alternative blowing agents to more readily permeate out of polyurethane foam while air permeates into the foam. It is known that air has poorer insulative properties (resulting in foam with higher k-factor) than carbon dioxide and other alternative blowing agents such as HCFCs. The foams of the present invention can resist the permeation of carbon dioxide better than conventional foams. The foams of the present invention can retain their insulative properties longer than similar conventional foams.

The foams of the present invention can be prepared by admixing a polyurethane formulation including a glycerine initiated ethoxylated polyol prepared from a formulation including from about two to about three moles of ethylene oxide per mole of glycerine initiator. Such polyols can be prepared in any way known to be useful by those skilled in the art of preparing polyols. However, preferably, the polyols are prepared by combining the initiator and the ethylene oxide in the presence of a catalyst such as KOH or a tertiary amine.

The glycerine initiated ethoxylated polyols of the present invention are particularly advantageous in that they have low viscosities. Polyols having too high a viscosity can be difficult to handle when preparing polyurethanes. Such polyols often have compatibility problems with the polyisocyanate components of polyurethane formulations. Incompatible polyols can often cause foam formulations to fail to foam or else produce foams having very poor physical properties.

The foams of the present invention can also be prepared with a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2. Preferably the ratio of moles of ethylene carbonate to initiator functionality is from 0.6 to 1.5 and more preferably the ratio is 1. The initiators of this group of polyols have from 3 to about 10 carbons. These sugar-like compounds include, but are not limited to the linear sugars and compounds such as 1,3,5-trihydroxy-3-methyl-pentane. The linear sugars include sorbitol, mannitol, xylitol, arabitol and the like. When a linear sugar is used as the initiator for the polyols of the present invention, preferably that sugar is sorbitol.

The linear initiators used to prepare the foams of the present invention have from 3 to 8 hydroxy groups per molecule. Preferably, the hydroxy functionality of these molecules is from 3 to 7 and, more preferably, 3 to 6. For the purposes of the present invention, substantially linear means non-cyclic and with minimal branching. For example, 1,3,5-trihydroxy-3-methyl-pentane is substantially linear. These initiators have from 3 to about 10 carbon atoms, but preferably have from 3 to 8 carbon atoms, and, more preferably, have from 3 to 6 atoms. Each initiator has at least one secondary or tertiary hydroxyl group. For convenience of reference only, these polyols shall hereinafter be referred to as sugar initiated and these initiators shall be referred to as sugars. However, these terms are expressly defined to include all substantially linear compounds having from 3 to 8 hydroxy groups and 3 to 10 carbons per molecule.

The sugar initiators are ethoxylated using from about 2 to about 15 moles of ethylene carbonate per mole of initiator wherein the ratio of moles of ethylene carbonate to initiator functionality is from 0.5 to less than 2. The use of ethylene carbonate for alkoxylation results in a polyol having a lower viscosity than one prepared with ethylene oxide. The foams of the present invention are improved in at least two ways over similar conventional foams. First, low viscosity polyols are often easier to handle when preparing a polyurethane foam. Second, these polyols can be more polyisocyanate compatible. Incompatibility between a polyisocyanate and a polyol in a polyurethane formulation can result in a foam having poor physical properties.

The sugar initiated and glycerine initiated polyols are present in the formulations of the present invention, alone or together, at a concentration of from about 10 to about 90 parts per 100 parts of total active hydrogen containing admixture. Preferably, they are present at from about 15 to about 85 parts and more preferably from about 25 to about 75 parts per 100 parts of active hydrogen containing admixture. For the purposes of the present invention, parts per 100 parts of total active hydrogen containing admixture shall be calculated by considering only non-blowing agent, active hydrogen containing compounds.

The formulations of the present invention also include from about 90 to about 10 parts per 100 parts of total active hydrogen containing admixture of a polyester or polyether polyol having an equivalent weight of from about 40 to about 400 and a nominal functionality of from 2 to 8. These polyols are conventional and, except for amount, functionality and equivalent weight limitations are otherwise similar to the base polyols and polyester polyols described below. Preferably these polyols are present at from about 85 to about 15 and, more preferably, from about 75 to about 25 parts per 100 parts of active hydrogen containing admixture.

In addition to the polyols above, the formulations of the present invention can include minor amounts of conventional polyols. Conventional polyols most commonly used in polyurethane production are those compounds having at least two hydroxyl groups. Those compounds are referred to herein as base polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, 1–76 (1978). However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine terminated polyols, polymercaptans and other isocyanate-reactive compounds are also suitable in the present invention. Polyisocyanate polyaddition active hydrogen containing confounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

Yet another class of useful polyols are the polyester polyols. Particularly polyester polyols having difunctionality are useful with the present invention. Examples of useful polyester polyols include, for example, polybutanediol adipate, poly ε-caprolactone, and diethylene glycol-phthalate or terephthalate polymers. However, any polyester polyol can be used with the present invention.

Another embodiment of the present invention is a polyurethane formulation including a polyisocyanate. The polyisocyanates of the present invention can be selected from organic polyisocyanates, modified organic polyisocyanates, organic polyisocyanate-based prepolymers, and mixtures thereof. These can include aliphatic and cycloaliphatic isocyanates, but aromatic and especially multifunctional aromatic isocyanates are preferred. Preferred are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylenediisocyanate; 1-isocyanato-3,5,5-trimethyl-1-3-isocyanatomethylcyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Also advantageously used for the polyisocyanate component are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents of from 10 to 40 weight percent, more preferably from 20 to 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures, 4,4'-, 2,4'- and 2,2'-diphenylmethanediisocyanate and the corresponding isomeric mixtures; mixtures of diphenylmethane diisocyanates and PMDI and mixtures of toluenediisocyanates and PMDI and/or diphenylmethane diisocyanates.

Suitable also are prepolymers having NCO contents of from 5 to 40 weight percent, more preferably from 15 to 30 weight percent. These prepolymers are prepared by reaction of the di- and/or poly-isocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 20 to 35 weight percent, based on the weight of the prepolymer, prepared by the reaction of polyoxy-alkylene polyols, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.5 to about 3.5. The viscosity of the polyisocyanate component is preferably from about 25 to about 5,000 centipoise (cps) (0.025 to about 5 Pa·s), but values from about 100 to about 1,000 cps at 25° C. (0.1 to 1 Pa·s) are preferred for ease of processing. Similar viscosities are preferred where alternative polyisocyanate components are selected.

Polyurethane formulations usually consist of two components. An isocyanate component (hereinafter A side) and a isocyanate reactive component (hereinafter B side). The formulations of the present invention can also include another component including additives, catalysts and the like (hereinafter C side). Often the additives and catalysts are included in the B side.

Additives which can be used with the formulations of the present invention include any known to be useful by one of ordinary skill in the art of preparing polyurethanes. For example, additives such as fillers, antioxidants, flame retardants can be used with the present invention. Other additive useful include, but are not limited to: pigments, impact modifiers, ordorants, and the like.

The formulations of the present invention advantageously include a carbon dioxide blowing agent. However, any blowing agent or mixture thereof as well as a carbon dioxide blowing agent is suitable for use in the practice of the invention. Suitable blowing agents include inorganic blowing agents such as water, organic blowing agents which are volatile at reaction temperatures and dissolved inert gases. Suitable organic blowing agents include acetone; ethyl acetate; methanol; ethanol; halogen-substituted alkanes such as methylene chloride, chloroform, ethylidene chloride, vinylidene chloride, monofluorotri-chloromethane, chlorodifluoromethane, dichlorodi-fluoromethane and the like; butane; hexane; heptane; pentane; diethyl ether; and the like. Gases inert to the starting components such as nitrogen, air, carbon dioxide and the like are also useful blowing agents. Compounds, such as azides, which decompose at suitable temperatures to produce gases such as nitrogen are also useful. Preferred blowing agents are compounds which boil between about −50° and 100° C., more preferably between about 0° and 50° C.

The amount of blowing agent employed is not critical to the invention, but is preferably sufficient to foam the reaction mixture. The amount will vary with factors such as the density desired in a foamed product.

Water is a useful blowing agent for use in the practice of the invention. In addition to generating carbon dioxide gas for foaming, water reacts quickly with polyisocyanate components, thus contributing to early polymer strength needed for gas retention. Generally, when water is used, it is present in proportions of from about 1.5 to about 8 weight percent of water based on total weight of active hydrogen components.

The formulations of the present invention can include an isocyanurate and/or a urethane catalyst. The polyurethane catalyst is preferably incorporated in the formulation in an amount suitable to increase the rate of reaction between the isocyanate groups of the composition of the present invention and a hydroxyl-reacting species. Although a wide variety of materials is known to be useful for this purpose, the most widely used and preferred catalysts are the tertiary amine catalysts and the organotin catalysts.

Examples of the tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 2 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the polyol formulation.

Suitable catalysts for use with the present invention which catalyze the formation of isocyanurates are such as those mentioned in Saunders and Frisch, *Polyurethanes, Chemistry and Technology* in 1 *High Polymers* Vol. XVI, pp. 94–97 (1962). Such catalysts are referred to herein as trimerization catalysts. Examples of these catalysts include aliphatic and aromatic tertiary amine compounds, organometallic compounds, alkali metal salts of carboxylic acids, phenols and symmetrical triazine derivatives. Preferred catalysts are potassium salts of carboxylic acids such as potassium octoate and tertiary amines such as, for instance, 2,4,6-tris(dimethyl aminomethyl) phenol.

The following examples are provided to illustrate the present invention. The examples are not intended to limit the scope of the present invention and they should not be so interpreted. Amounts are in weight parts or weight percentages unless otherwise indicated.

EXAMPLE 1

Synthesis of a Glycerine Initiated Polyol 3,192 grams of glycerine and 12 grams of KOH are charged into a 5 gallon (18.9 liter) pressurized reactor having a stirrer and a thermocouple and a pressure transducer. The vessel is first heated at 120° C. under vacuum to remove water for 1 hour. Then 3060 grams of ethylene oxide are added and the vessel heated to about 120° C. to maintain the pressure at about 60–70 psi (413–483 mPa) for 10 hours. The product is neutralized with magnesium silicate and filtered. The resultant polyol has a percent OH of 28.9 and a viscosity of 100 cps (0.10 Pa·s) at 25° C.

EXAMPLE 2

Synthesis of a Sugar Initiated Polyol 100 grams of sorbitol, 289.9 grams of ethylene carbonate and 2.9 grams of potassium carbonate are charged into a 500 ml round bottom flask equipped with a stirrer, thermometer, a nitrogen purge and a condenser. The flask is heated at 150° C. for 8 hours. The product is tested and shows a complete disappearance of absorption at 1800 cm$^{-1}$ which indicates that the reaction of the ethylene carbonate is complete. The product is admixed with magnesium silicate and filtered. The resultant polyol has a percent OH of 23.0 and a viscosity of 110 cps (0.11 Pa·s) at 25° C.

COMPARATIVE EXAMPLE 3

A sample of polyol prepared by conventional ethoxylation wherein 6 moles of ethylene oxide are used per mole of sorbitol initiator to prepare the polyol is analyzed for viscosity, percent OH and isocyanate compatibility. The percent OH is 23.1, the viscosity am 50° C. is ,920 cps (1.92 Pa·s) and the polyol is observed to be incompatibility with polymethylene polyphenyl polyisocyanate.

EXAMPLE 4

Thin Film Permeability Measurements

Thin films are prepared by admixing the material to be tested and polymethylene polyphenyl polyisocyanate (isocyanate equivalent weight of 134) at the indicated isocyanate index and then pouring the admixture onto a teflon plate heated to 180° C. The admixture is then inserted into a press with a 5 mil (0.13 mm) spacer and pressure applied for at least 2 hours. Film thickness was determined to be from 5 to 10 mil (0.13 to 0.26 mm) for each film.

Oxygen permeabilities through film samples of polymer are determined using an OXTRAN 10/50A* Permeability Analyzer (*OXTRAN 10/50A is a trade designation of Modern Controls, Inc.). The measurements are performed at 25° C. (thermostated with a constant temperature bath and circulator) using pure oxygen under either humid or dry conditions. The permeability (transmission rate) is obtained by placing the film across the test cell while purging oxygen onto the upstream side of this barrier. Permeability was determined after steady-state conditions are achieved, wherein the polymer is saturated with gas (under the test conditions) and the transmission rate is at a stable value. The films are subjected to at least three days under the experimental conditions in order to ensure the reading of a steady state transmission rate. A relative humidity of 50 percent to 75 percent ("wet") is obtained in the permeation cell by sending the gases through bubblers containing distilled water. An environment of approximately 0% relative humidity ("dry") is maintained by routing the dried gases directly to the testing cell. Carbon dioxide permeability through the film samples was measured using a PERMATRAN C-200* (*PERMATRAN C-200 is a trade designation of Modern Controls, Inc.) computer controlled instrument. The films are tested at 25° C. under "dry" conditions using pure carbon dioxide.

The precision of the measurement of gas permeability through films is assessed by repeatedly measuring the transmission rate of a film standard throughout the course of the experiments. The reproducibility of the transmission rate measurement is approximately $+/-1$ percent. The accuracy of the permeability values is primarily influenced by the accuracy in the measurement of film thickness. Since small variations in film thickness $(+/-0.4$ mil$)$ occur over a film's area, the accuracy of the permeability determination is estimated to be about $+/-6$ percent.

The permeability rates for the indicated films are displayed below in Table 1.

TABLE 1

| film | index | $O_2$ wet | $O_2$ dry | $CO_2$ dry |
|---|---|---|---|---|
| GLY-2EO[1] | 105 | 4.58 | 6.52 | 39.2 |
| GLY-2EO[1] | 67 | 1.16 | 2.39 | 10.2 |
| GLY-3EO[2] | 105 | 2.90 | 3.16 | 19.5 |

TABLE 1-continued

| film | index | $O_2$ wet | $O_2$ dry | $CO_2$ dry |
|---|---|---|---|---|
| SOR-4EO[3] | 105 | 3.35 | 5.03 | no data |
| SOR-4EO[3] | 67 | 0.84 | 1.48 | no data |
| SOR-6EO[4] | 106 | 2.19 | 3.35 | 15.7 |
| SOR-6EO[4] | 67 | 1.16 | 0.90 | 8.9 |
| V-370[5]* | 105 | 13.9 | 20.1 | 135 |
| V-370[5]* | 67 | 12.5 | 19.2 | 127 |
| V-490[6]* | 105 | 10.0 | 13.3 | 80.6 |

*Not an example of the present invention.
Units are ml*mil/100 in$^2$ * day * Atm
[1]A glycerine initiated polyether prepared with 2 moles of ethylene oxide per mole of initiator.
[2]A glycerine initiated polyether prepared with 3 moles of ethylene oxide per mole of initiator.
[3]A sorbitol initiated polyether prepared with 3 moles of ethylene carbonate per mole of sorbitol.
[4]A sorbitol initiated polyether prepared with 6 moles of ethylene carbonate per mole of sorbitol.
[5]VORANOL 370, A control polyol prepared using a sucrose/glycerine initiator having an equivalent weight of about 150 and a nominal functionality of 6.9.
**(VORANOL 370 is a trade designation of The Dow Chemical Company).
[6]VORANOL 490*, A control polyol prepared using a sucrose and glycerine initiator having an equivalent weight of about 115 and a nominal functionality of 4
**(VORANOL 490 is a trade designation of The Dow Chemical Company).

EXAMPLE 5

A polyurethane foams is prepared by admixing the formulation displayed below in Table 2 using a drill press equipped with a Cowles mixing blade at 1,000 rpm for 10 seconds at ambient temperature. The foaming admixture is then poured into a 14"×14"×14" (35.6 cm×35.6 cm×35.6 cm) box. The foam is then tested and the results are displayed below in Table 3.

COMPARATIVE EXAMPLE 6

A polyurethane foam is prepared and tested substantially identically to Example 5 using the formulation in Table 2 below. Results are displayed in Table 3.

TABLE 2

| INGREDIENT | EXAMPLE 5 | COMPARATIVE EXAMPLE 6* |
|---|---|---|
| GLY-2EO[1] | 54 | |
| VORANOL 490[2,A] | | 75 |
| PS 3152[3,B] | 18 | 25 |
| Water | 0.46 | 0.46 |
| DC 5357[4,C] | 2.4 | 2.4 |
| PC-5[5,D] | 0.55 | 0.91 |
| PC-8[6,D] | 0.43 | 0.67 |
| TMR-2[7,E] | 0.37 | 0.49 |
| T-12[8,F] | 0.02 | 0.01 |
| HCFC-141B[9,G] | 21.4 | 21.4 |
| PAPI 27[10] | 100 index | 100 index |

*Not an example of the present invention.
[1]GLY-2EO, a glycerine initiated polyether polyol prepared with 2 moles of ethylene oxide per mole of glycerine.
[2]VORANOL 490 is a control polyol prepared using a sucrose and glycerine initiator having an equivalent weight of about 115 and a nominal functionality of 4.
[3]PS 3152 is a 180 equivalent weight polyol having a functionality of 2.
[4]DC 5357 is a silicone surfactant.
[5]PC-5 (POLYCAT 5) is a tri-tertiary amine catalyst.
[6]PC-8 (POLYCAT 8) is a tertiary amine catalyst.
[7]TMR-2 is a quaternary ammonium salt catalyst.
[9]T-12 is a dibutyl tin dilaurate catalyst
[10]HCFC-141B is a hydrochlorofluorocarbon blowing agent.
[11]PAPI 27 is a polymethylene polyphenyl polyisocyanate having an isocyanate equivalent weight of 135.
[A]VORANOL 490 and PAPI 27 are trade designations of The Dow Chemical Company.
[B]PS 3152 is a trade designation of Stepan Chemical Company.
[C]DC 5357 is a trade designation of Air Products and Chemicals Inc.
[D]POLYCAT 5 and POLYCAT 8 are trade designations of Air Products and Chemicals Inc.
[E]TMR-2 is a trade designation of Air Products and Chemicals Inc.
[F]T-12 is a trade designation of Air Products and Chemicals Inc.
[G]HCFC-141B is a trade designation of Atochem.

TABLE 3

|  | EXAMPLE 5 | COMPARATIVE EXAMPLE 6* |
|---|---|---|
| Initial k factor** | 0.136 | 0.124 |
| 6 month k factor** | 0.159 | 0.164 |

*Not an example of the present invention.
**ASTM C-518-85

EXAMPLE 7

A polyurethane foam is prepared and tested substantially identically to Example 5 using the formulation in Table 4 below. Results are displayed in Table 5.

COMPARATIVE EXAMPLE 8

A polyurethane foam is prepared and tested substantially identically to Example 5 using the formulation in Table 4 below. Results are displayed in Table 5.

TABLE 4

| INGREDIENT | EXAMPLE 7 | COMPARATIVE EXAMPLE 8* |
|---|---|---|
| SORB-6EO[1] | 23 | |
| VORANOL 490[2,A] | 68 | 75 |
| PS 3152[3,B] | | 25 |
| Water | 0.46 | 0.46 |
| DC 5357[4,C] | 2.4 | 2.4 |
| PC-5[5,D] | 0.77 | 0.92 |
| PC-8[6,D] | 0.51 | 0.67 |
| TMR-2[7,E] | 0.49 | 0.49 |
| T-12[8,F] | 0.01 | 0.01 |
| HCFC-141B[9,G] | 21.4 | 21.4 |
| PAPI 27[1,10] | 100 index | 100 index |

*Not an example of the present invention.
[1]SORB-6EO, a sorbitol initiated polyether polyol prepared with 6 moles of ethylene carbonate per mole of sorbitol.
[2]VORANOL 490 is a control polyol prepared using a sucrose and glycerine initiator having an equivalent weight of about 115 and a nominal functionality of 4.
[3]PS 3152 is a 180 equivalent weight polyol having a functionality of 2.
[4]DC 5357 is a silicone surfactant.
[5]PC-5 (POLYCAT 5) is a tri-tertiary amine catalyst.
[6]PC-8 (POLYCAT 8) is a tertiary amine catalyst.
[7]TMR-2 is a quaternary ammonium salt catalyst.
[9]T-12 is a dibutyl tin dilaurate catalyst
[10]HCFC-141B is a hydrochlorofluorocarbon blowing agent.
[11]PAPI 27 is a polymethylene polyphenyl polyisocyanate having an isocyanate equivalent weight of 135.
[A]VORANOL 490 and PAPI 27 are trade designations of The Dow Chemical Company.
[B]PS 3152 is a trade designation of Stepan Chemical Company.
[C]DC 5357 is a trade designation of Air Products and Chemicals Inc.
[D]POLYCAT 5 and POLYCAT 8 are trade designations of Air Products and Chemicals Inc.
[E]TMR-2 is a trade designation of Air Products and Chemicals Inc.
[F]T-12 is a trade designation of Air Products and Chemicals Inc.
[G]HCFC-141B is a trade designation of Atochem.

TABLE 5

|  | EXAMPLE 7 | COMPARATIVE EXAMPLE 8* |
|---|---|---|
| Initial k factor** | 0.128 | 0.127 |
| 6 month k factor** | 0.161 | 0.166 |

*Not an example of the present invention.
**ASTM C-518-85

EXAMPLE 9

A polyurethane foam is prepared and tested substantially identically to Example 5 using the formulation in Table 6 below. Results are displayed in Table 7.

EXAMPLE 10

A polyurethane foam is prepared and tested substantially identically to Example 5 using the formulation in Table 6 below. Results are displayed in Table 7.

COMPARATIVE EXAMPLE 11

A polyurethane foam is prepared and tested substantially identically to Example 5 using the formulation in Table 6 below. Results are displayed in Table 7.

TABLE 6

|  | Example 9 | Example 10 | Comparative Example 11* |
|---|---|---|---|
| GLY-2EO[1] | 50 | 50 | |
| V-370[2,A] | 50 | 50 | 100 |
| Water | 3.9 | 4.3 | 4.0 |
| B-8404[3,B] | 3.0 | 3.0 | 3.0 |
| P-8[4,C] | 1.0 | 1.0 | 1.25 |
| PAPI 27[5,A] | 83 index | 105 index | 105 index |

*Not an example of the present invention.
[1]GLY-2EO, a glycerine initiated polyether polyol prepared with 2 moles of ethylene oxide per mole of glycerine.
[2]VORANOL 370 is a control polyol prepared using a sucrose and glycerine initiator having an equivalent weight of about 150 and a nominal functionality of 6.9.
[3]B-8404 is silicone surfactant.
[4]PC-8 (POLYCAT 8) is a tertiary amine catalyst.
[5]PAPI 27 is a polymethylene polyphenyl polyisocyanate having an isocyanate equivalent weight of 135.
[A]VORANOL 370 and PAPI 27 are trade designations of The Dow Chemical Company.
[B]B-8404 is a trade designation of TH Goldshmidt Company.
[C]POLYCAT 8 is a trade designation of Air Products and Chemicals Inc.

TABLE 7

|  | Example 9 | Example 10 | Comparative Example 11* |
|---|---|---|---|
| Initial k factor** | 0.168 | 0.168 | 0.168 |
| 6 month k factor** | 0.194 | 0.214 | 0.230 |

*Not an example of the present invention.
**ASTM C-518-85

What is claimed is:

1. A polyurethane foam having improved retention of insulative properties comprising the product of admixing a polyurethane formulation including
   (1) a polyisocyanate,
   (2) a carbon dioxide blowing agent, and
   (3) an active hydrogen containing admixture including:
   (A) from about 10 to about 90 parts per 100 parts total active hydrogen containing admixture of an active hydrogen containing material selected from the group consisting of:
      (i) a glycerine initiated ethoxylated polyol prepared from a formulation including from about two to about three moles of ethylene oxide per mole of glycerine initiator;
      (ii) a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2; and
      (iii) mixtures thereof; and
   (B) from about 90 to about 10 parts per 100 parts of total active hydrogen containing admixture of a polyester or polyether polyol having an equivalent weight of from about 40 to about 400 and a nominal functionality of from 2 to 8, under reaction conditions sufficient to prepare a polyurethane foam.

2. The foam of claim 1 wherein the tri- to octa-functional substantially linear hydroxy alkane initiated ethylene carbonate ethoxylated polyol is prepared from a formulation including sorbitol as the initiator.

3. The foam of claim 2 wherein the tri- to octa-functional substantially linear hydroxy alkane initiated ethylene carbonate ethoxylated polyol is prepared from a formulation having from 4 to 6 moles of ethylene carbonate per mole of sorbitol.

4. The foam of claim 1 wherein component (A) of the active hydrogen containing admixture is a glycerine initiated ethoxylated polyol prepared from a formulation including from about two to about three moles of ethylene oxide per mole of glycerine initiator.

5. The foam of claim 1 wherein component (A) of the active hydrogen containing admixture is a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2.

6. A method of preparing a polyurethane foam having improved retention of insulative properties comprising admixing a polyurethane formulation including (1) a polyisocyanate, (2) a carbon dioxide blowing agent, and (3) an active hydrogen containing admixture including (A) from about 10 to about 90 parts per 100 parts total active hydrogen containing admixture of an active hydrogen containing material selected from the group consisting of:

(i) a glycerine initiated ethoxylated polyol prepared from a formulation including from about two to about three moles of ethylene oxide per mole of glycerine initiator;

(ii) a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2; and the viscosity am 50° Cis 1,920 cps (1.92 Pa.s) and the (iii) mixtures thereof; and (B) from about 90 to about 10 parts per 100 parts of total active hydrogen containing admixture of a polyester or polyether polyol having an equivalent weight of from about 40 to about 400 and a nominal functionality of from 2 to 8, under reaction conditions sufficient to prepare a polyurethane foam.

7. The method of claim 6 wherein the tri- to octa-functional substantially linear hydroxy alkane initiated ethylene carbonate ethoxylated polyol is prepared from a formulation including sorbitol as the initiator.

8. The method of claim 7 wherein the tri- to octa-functional substantially linear hydroxy alkane initiated ethylene carbonate ethoxylated polyol is prepared from a formulation having from 4 to 6 moles of ethylene carbonate per mole of sorbitol.

9. The method of claim 6 wherein component (A) of the active hydrogen containing admixture is a glycerine initiated ethoxylated polyol prepared from a formulation including from about two to about three moles of ethylene oxide per mole of glycerine initiator.

10. The method of claim 6 wherein component (A) of the active hydrogen containing admixture is a tri- to octa-functional substantially linear hydroxy alkane initiated ethylene carbonate ethoxylated polyol prepared from a formulation including from about 2 to about 15 moles of ethylene carbonate per mole of initiator wherein the ratio of moles of ethylene carbonate to initiator functionality is from 0.5 to less than 2.

* * * * *